Sept. 2, 1952          R. B. JACOBS          2,608,855
METHOD AND APPARATUS FOR MEASURING TIGHTNESS OF VESSELS
Filed June 14, 1946
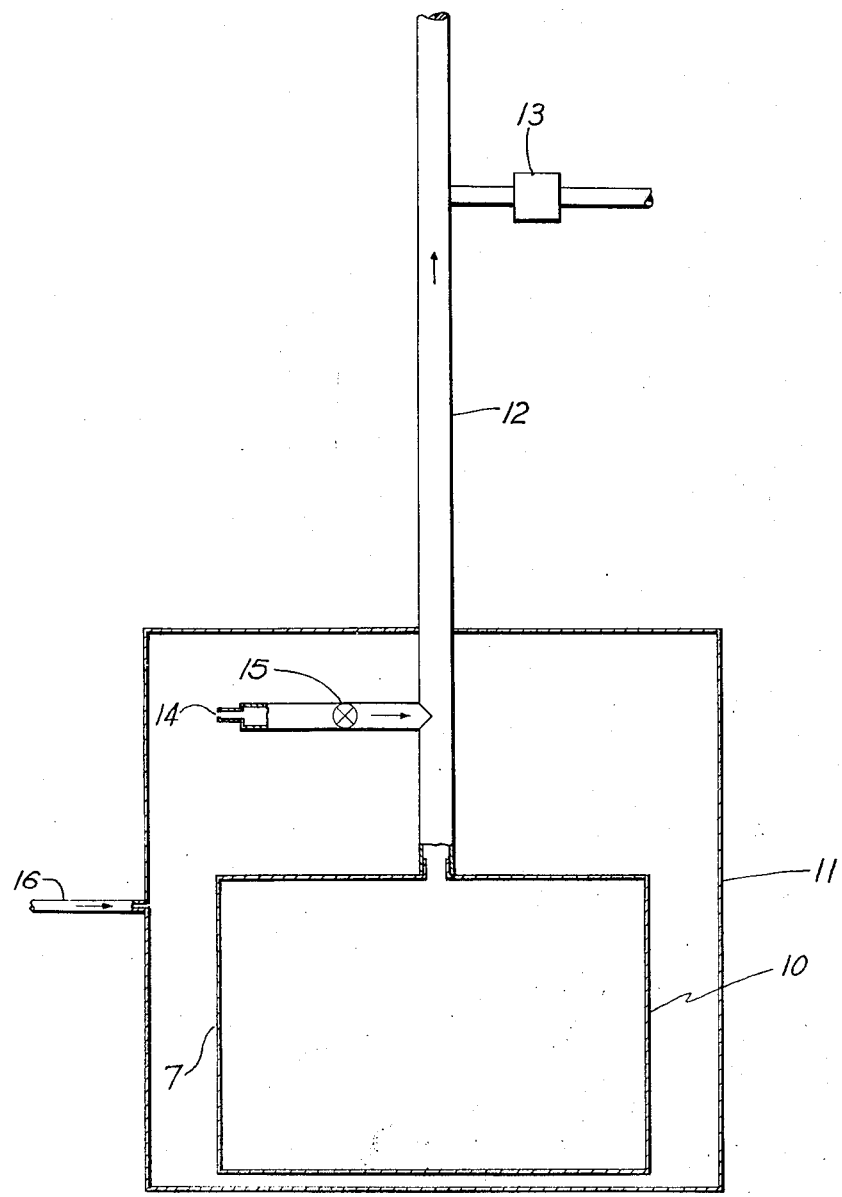
Inventor
R. B. Jacobs
By Robert A. [signature]
Attorney Patented Sept. 2, 1952

2,608,855

UNITED STATES PATENT OFFICE 2,608,855

METHOD AND APPARATUS FOR MEASURING TIGHTNESS OF VESSELS

Robert B. Jacobs, Rochester, N. Y., assignor, by mesne assignments, to the United States of America as represented by the United States Atomic Energy Commission Application June 14, 1946, Serial No. 676,813

4 Claims. (Cl. 73—40)

The present invention relates to a method and apparatus for measuring tightness of vessels and is more particularly directed to a method and apparatus for more accurately measuring the rate of in-leakage in closed vessels.

It is a primary object of the present invention to provide an improved method and apparatus for measuring vessel tightness or rate of in-leakage more accurately and in much shorter time than methods heretofore in use.

The method most commonly used to measure vessel tightness is known as the "pressure build-up" method and may be briefly described in connection with the following apparatus and in the following manner.

The apparatus comprises a vacuum pump connected to the vessel under test through a vacuum line, a valve in the line adjacent the pump, and a vacuum gauge such as the McLeod type of gauge provided in the line between the valve and the vessel. To determine if there is any leakage in the vessel and if there is any leakage, the amount thereof, the vacuum pump is operated with the valve open until the vessel is substantially completely evacuated. If the reading on the gauge does not show a substantially complete vacuum in the vessel, a leakage is present in the vessel. The next step is to close the valve and take a reading on the gauge. Further readings are taken at definite time intervals and from these readings the amount of in-leakage can be computed. It is readily apparent therefore, that if the leak is very small, and the vessel large, a long period of time is necessary to take the necessary number of readings to compute the amount of in-leakage in the vessel.

The present method and apparatus makes possible a substantially quantitative measure of vessel tightness or rate of in-leakage more accurately and in much shorter time than the conventional "pressure build-up" method.

Other objects and advantages of the present invention will be apparent to those skilled in this art from the following description and accompanying drawing in which is shown a diagrammatic illustration of a form of apparatus for carrying the present invention into effect.

Referring to the drawing, reference numeral 10 indicates the vessel under test, and numeral 11 indicates a gas-tight hood enclosing the vessel under test. A vacuum conduit 12 is connected to the vessel and extends through the hood. An analyzer 13 is provided in a part of the conduit outside the hood that quantitatively measures the concentration of helium or other gaseous medium flowing through the line 12. A calibrated reference leak 14 is connected to the vacuum line within the hood and a valve 15 is interposed between the calibrated reference leak and the main portion of the vacuum line. A leak is a device for introducing a minute constant flow of a gas into an evacuated system. See "A Variable Capillary Gas Leak," Review of Scientific Instruments 6, 26 (1935), and Nier et al., United States Letters Patent No. 2,422,921. Reference numeral 16 indicates an inlet for introducing helium or other suitable gaseous material into the hood. The unknown leak in the vessel under test may be indicated by numeral 7. A suction pump (not shown) is provided in the line 12 above the analyzer 13 and is adapted to maintain a constant suction on vacuum line 12 while the test is being made.

The method of carrying out the present invention may be described as follows:

The vacuum pump (not shown) is operated until the vessel is substantially evacuated. Thereafter with the valve leading to the calibrated leak 14 in an open position, helium or any other gaseous medium is forced into the hood through an inlet 16 until its concentration therein is sufficient to give a predetermined reading on the analyser 13. This reading designated as Reading (1) is proportional to the total in-leakage consisting of (a) Unknown vessel leakage.
(b) Known leakage from the calibrated leak.

The valve 15 leading to the calibrated leak is then closed and a second reading taken designated as Reading (2). This reading is proportional to the unknown leakage alone. From these two readings the following equation may be derived:

$$\text{Unknown leakage} = \frac{\text{Reading (2)}}{\text{Reading (1)} - \text{Reading (2)}} \times \text{Calibrated leakage}$$

This equation gives the unknown leakage in terms of the two readings referred to above and the value of the calibrated leak. Knowledge of the helium concentration in the hood during the test is not necessary, the only requirement is that this concentration remain substantially constant during the time that the readings are taken. Normally this requires from five to ten minutes. Well constructed hoods show practically no decrease in helium concentration for longer periods.

The present invention has been described as applied to closed vessels, but it will be obvious that it is equally applicable to any closed system in which it is desirable or important to know if any leaks are present, and, if present, to know their magnitude.

While I have described a preferred method and apparatus for carrying out my invention, I wish it understood that I do not intend to be limited to the exact method and apparatus described inasmuch as, in view of the disclosure, obvious modifications will readily suggest themselves to those familiar with this art without departing from the spirit of my invention or the scope of the claims herein.

I claim:

1. The method of determining the leakage of a vessel that comprises surrounding said vessel with a designated gaseous atmosphere maintained at a substantially constant concentration, maintaining a substantially constant degree of suction on the interior of said vessel through a conduit, establishing an orifice of known size between said atmosphere and the interior of the suction conduit, taking a measurement functionally related to the concentration of designated gas flowing in the suction conduit, closing said orifice, again taking a measurement functionally related to the concentration of designated gas flowing in the suction conduit, and comparing the first and second measurements to determine the amount of vessel leakage.

2. The method of determining the leakage of a vessel that comprises surrounding said vessel with helium maintained at a substantially constant concentration, maintaining a substantially constant degree of suction on the interior of said vessel through a conduit, establishing an orifice of known size between said helium and the interior of the suction conduit, taking a measurement functionally related to the concentration of helium flowing in the suction conduit, closing said orifice, again taking a measurement functionally related to the concentration of helium flowing in the suction conduit, and comparing the first and second measurements to determine the amount of vessel leakage.

3. An apparatus for determining vessel leakage which comprises a gas-tight hood surrounding the vessel under test, an inlet in the hood for admitting gas therein, a vacuum line connected to said vessel, a calibrated reference leak connected to said vacuum line within the hood, a valve in the line between the reference leak and the outlet and an analyzer in the vacuum line outside the hood for measuring the concentration of a designated gas passing through the line.

4. An apparatus for determining vessel leakage which comprises a gas-tight hood surrounding the vessel under test, an inlet in the hood for admitting gas therein, a vacuum line connected to said vessel, a calibrated reference leak connected to said vacuum line within the hood, a valve in the line between the reference leak and the outlet, a helium gas inlet in said hood and a gauge in the vacuum line outside the hood for measuring the concentration of helium passing through the line.

ROBERT B. JACOBS.

REFERENCES CITED

The following references are of record in the file of this patent:

UNITED STATES PATENTS

| Number | Name | Date |
| --- | --- | --- |
| 1,933,791 | Crouch | Nov. 7, 1933 |
| 2,255,921 | Fear | Sept. 16, 1941 |
| 2,387,786 | Washburn | Oct. 30, 1945 |
| 2,422,921 | Nier et al. | June 24, 1947 |
| 2,486,199 | Nier | Oct. 25, 1949 |

OTHER REFERENCES

Benedict et al., "Engineering Developments in the Gaseous Diffusion Process," National Nuclear Energy Series, II-16 (1949), pages 54-56. McGraw-Hill, New York.